(12) United States Patent
Cohen-Zur

(10) Patent No.: US 8,862,159 B2
(45) Date of Patent: Oct. 14, 2014

(54) BUSINESS PROCESS ORIENTED NAVIGATION

(75) Inventor: Nirit Cohen-Zur, Ra'anana (IL)

(73) Assignee: SAP SE, Walldorf (DE)

( * ) Notice: Subject to any disclaimer, the term of this patent is extended or adjusted under 35 U.S.C. 154(b) by 62 days.

(21) Appl. No.: 13/546,508

(22) Filed: Jul. 11, 2012

(65) Prior Publication Data

US 2014/0018112 A1 Jan. 16, 2014

(51) Int. Cl.
*H04W 24/00* (2009.01)

(52) U.S. Cl.
USPC ............ 455/457; 455/456.1; 455/456.2; 455/456.3

(58) Field of Classification Search
CPC ......... H04W 4/22; H04W 4/043; H04W 4/02; H04W 4/023; H04W 4/046; H04W 4/028; H04W 4/04; H04L 67/18; H04L 12/2818; H04L 63/105; H04L 63/20; H04L 67/02; H04L 67/06; H04L 67/22; H04L 67/24; B63J 2099/008; B63J 99/00
USPC .................. 455/456.1, 456.2, 456.3, 457
See application file for complete search history.

(56) References Cited

U.S. PATENT DOCUMENTS

| | | | |
|---|---|---|---|
| 2006/0135183 A1* | 6/2006 | Zavada et al. | 455/457 |
| 2009/0187337 A1* | 7/2009 | Denk, Jr. | 701/201 |
| 2011/0086646 A1* | 4/2011 | Gupta et al. | 455/456.1 |

* cited by examiner

*Primary Examiner* — Kathy Wang-Hurst
(74) *Attorney, Agent, or Firm* — Buckley, Maschoff & Talwalkar LLC

(57) ABSTRACT

A current location of a mobile user device within a building may be determined and presented to the user via map information. Map information, including data about locations within the building, may be retrieved and business process information associated with a user's execution of a business process may be accessed. The business process may have a series of business process steps, and steps may be associated with the pre-determined locations within the building. It may then be automatically arranged for the map information to be displayed, along with information about the business process steps, via the mobile user device based on the current location of the mobile user device within the building. The system may automatically direct the user step-by-step through a process using map and/or audio information indicating what the next step is, where the next step is located, and/or time requirements associated with the next step.

21 Claims, 9 Drawing Sheets

| MAP ID 802 | LOCATION ID 804 | DESCRIPTION 806 | LOCATION 808 | CURRENT CONDITIONS 810 |
|---|---|---|---|---|
| M_101 | L_101 | SECURITY AISLE ONE | LAT/LONG | 5 MIN WAIT |
| M_101 | L_102 | SECURITY AISLE TWO | LAT/LONG | 10 MINUTE WAIT |
| M_101 | L_103 | TICKET COUNTER | RELATIVE LOCATION | NO WAIT |

BUSINESS PROCESS ORIENTED NAVIGATION

FIELD

Some embodiments relate to systems and methods associated with mobile user devices. More specifically, some embodiments are directed to systems and methods to provide business process oriented navigation via mobile user devices.

BACKGROUND

In some situations, a person may need to execute a series of business process steps associated with different locations within a building or similar structure. For example, a traveler might need to visit a security location within an airport terminal when he or she first arrives at an airport. After completing a security operation, the traveler might then need to check-in with an airline employee at a ticket counter within the airport terminal. Eventually, the traveler would need to go to an appropriate gate within the airport terminal to board his or her flight. Performing each of these business process steps in an efficient and accurate manner can be difficult, especially when a person is not familiar with the building and/or the various locations within the building or does not have a lot of time to perform various tasks.

Accordingly, methods and mechanisms to efficiently, accurately, and/or automatically facilitate performance of a series of business process steps may be provided in accordance with some embodiments described herein.

BRIEF DESCRIPTION OF THE DRAWINGS

FIG. 8 illustrates a portion of a map database that might be stored in accordance with some embodiments.

DETAILED DESCRIPTION

In some situations, a person may need to execute a series of "business process steps" associated with different locations within a building or similar structure. As used herein, the phrase "business process step" might refer to, for example, any action or interaction involving the person. Moreover, the term "building" might refer to any structure having locations where business process steps might be performed. By way of example, business process steps might be associated with a patient visiting an x-ray technician within a hospital, a student registering for a particular class within a university library, or a person obtaining a visa at an embassy. Note that in some cases, a person may need to execute one or more steps within a particular time frame or deadline.

Figure 1:
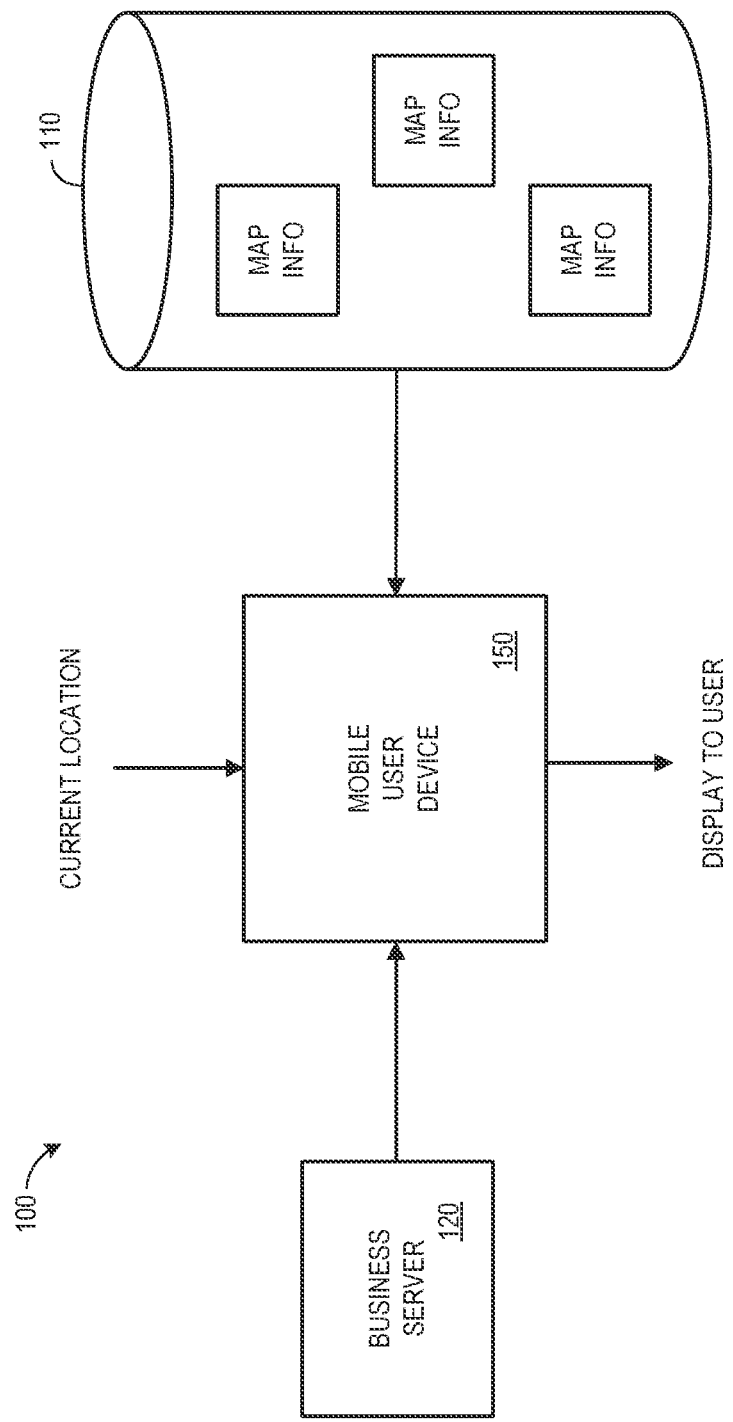
FIG. 1 is a block diagram of a system architecture according to some embodiments.

Performing business process steps in an efficient and accurate manner can be difficult, especially when a person is not familiar with a building and/or various locations within the building and/or when a person has limited time frames to perform a process. For example, a person might not know how to get from a ticket counter to a baggage check-in location within an airport terminal. To address such problems, FIG. 1 is a block diagram of a system 100 according to some embodiments. The system 100 includes a mobile user device 150 that can retrieve map information from a map database 110. The mobile user device 150 might be associated with, by ways of example a mobile computer, a smartphone, a tablet, a gaming device, a navigation device, a music player, or glasses having a lens based display. The map information in the map database 110 might, for example, include information about walls, pathways, rooms, floors, etc. associated with a building, such as an airport terminal, a train station, a hospital, a hotel, a university, a trade expo or convention, or a governmental building.

The mobile user device 150 may also receive information about a series of business process steps from a business server 120. By way of example only, the business server 120 might be associated with an Enterprise Resource Planning (ERP) server, a business services gateway, a HyperText Transfer Protocol (HTTP) server, and/or an Advanced Business Application Programming (ABAP) server. According to some embodiments, the system 100 may provide connectivity to the business server 120, such as one associated with enterprise software (including CRM, ERP, and other backend processes) to help guide a traveler, for example, through steps beginning upon arrival at an airport until he or she boards an aircraft in combination with GPS and any other resources in substantially real time. In this way, the power of backend knowledge (for example at an airline server) may be used to help a passenger efficiently check-in, take care of taxes, send their belongings, etc. using a mobile display and appropriate real time instructions governed by the backend process.

According to some embodiments, the business server 120 may directly communicate with one or more remote mobile user devices 150 via the Internet. According to other embodiments, a gateway may be provided between the business server 120 and the mobile user devices 150. The mobile user devices 150 may include one or more processors to receive electronic files and/or to execute applications and/or components (e.g., a plug-in that is integrated to a smartphone or tablet).

Note that FIG. 1 represents a logical architecture for the system 100 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the map database 110, business server 120 and mobile user devices 150 may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
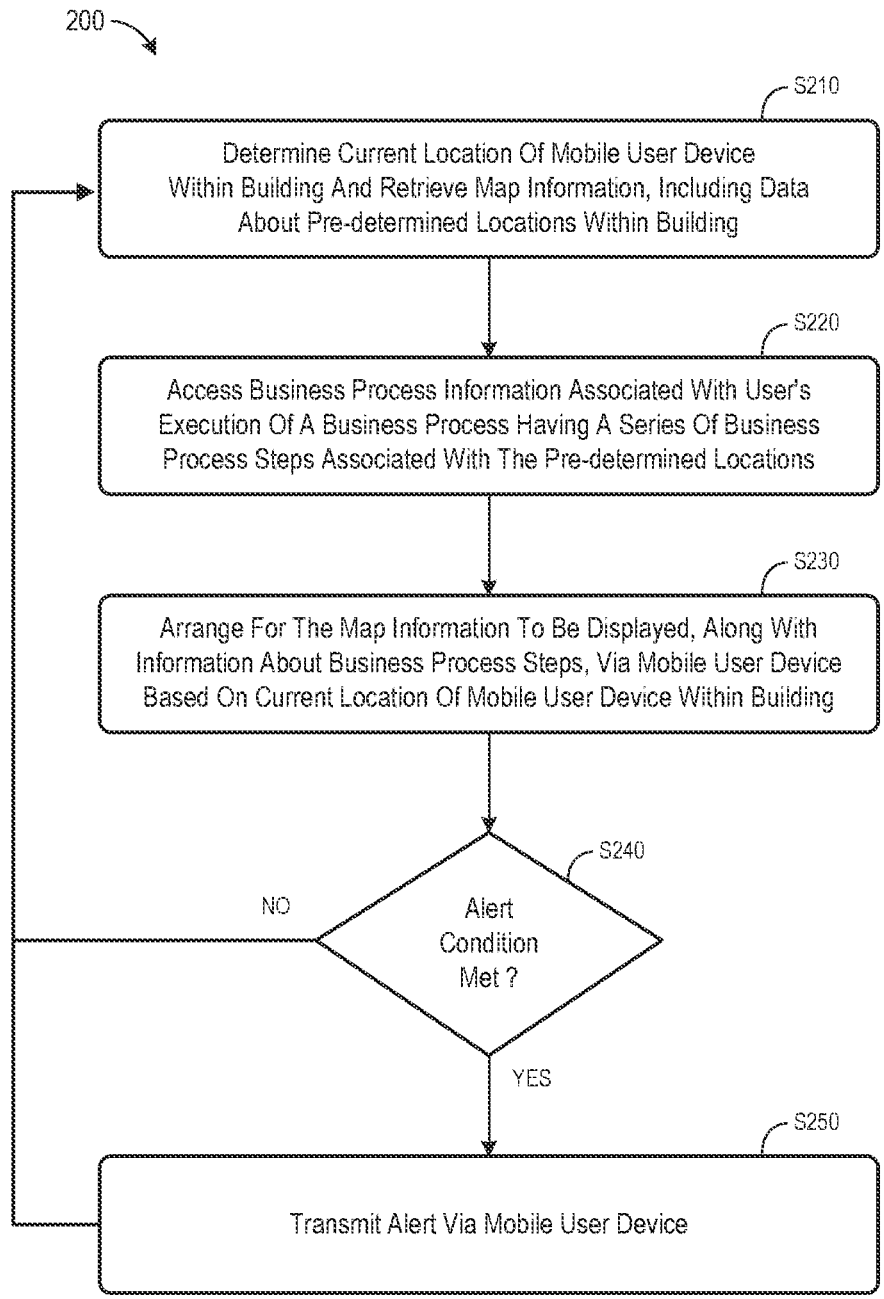
FIG. 2 is a flow diagram of a process in accordance with some embodiments.

According to some embodiments, the mobile user device 150 may receive or determine a current location (e.g., indicating where the device is currently physically located within the building) and use that information, along with the map information and business process step information, to output navigation information to a user via a display. FIG. 2 is a flow diagram of a process 200 that might be associated with the illustration of the system 100 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a current location of a mobile user device within a building may be determined. The mobile user device may be associated with a user, such as the user's mobile computer (e.g., laptop computer), smartphone, tablet, gaming device, navigation device (Global Positioning System ("GPS") enabled device, music player, or glasses. The building might be associated with, for example an airport terminal, a train station or subway system, a hospital, an underground transportation system, or a governmental building. The determining or current location performed at S210 might be associated with GPS information (e.g., latitude and longitude information), Wi-Fi information and/or wireless telephone information (e.g., which cell towers are in communication with the mobile user device).

At S210, map information may also be retrieved, the map information including data about pre-determined locations within the building. For example, the map information might include image information (e.g., a picture or drawing of the building layout), video information, latitude and longitude information, building structure information (walls, rooms, floors, etc.), building pathways information, entrance information, exit information, real-time information (e.g., a current wait time at a particular location), and/or multi-floor information (including the locations of stairways, elevators, and/or escalators).

At S220, business process information associated with the user's execution of a business process may be accessed. The business process may have a series of business process steps, and at least some of the business process steps may be associated with the pre-determined locations within the building and/or time limitation. The business process might be associated with, for example, a travel process, a governmental process, and/or a medical procedure. For example, a business process step of checking-in with an airline might be associated with the location of an airline ticket counter. According to some embodiments, the accessing performed at S220 includes receiving information from a remote business server, a travel service, and/or a building information system.

Figure 3:
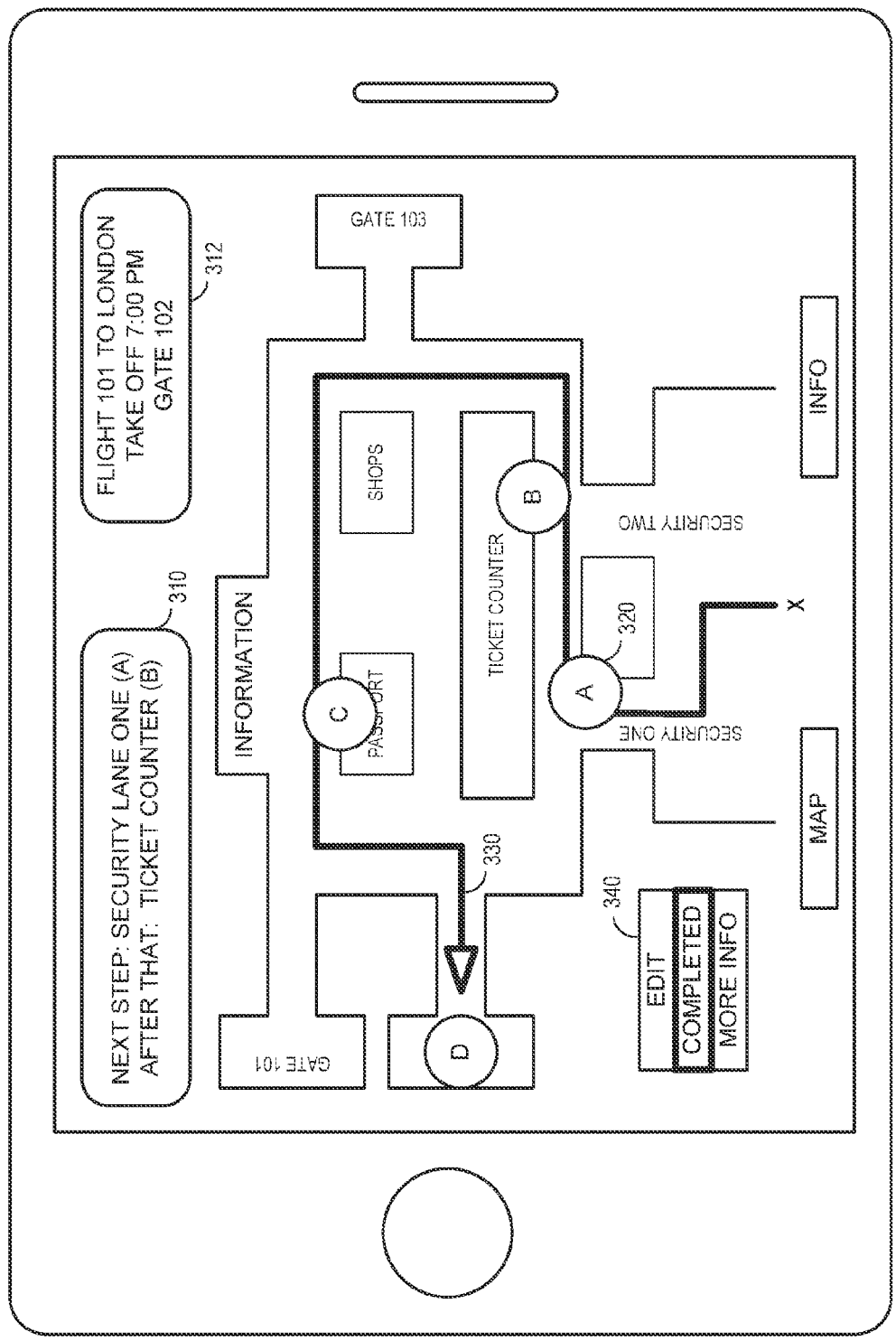
FIG. 3 is an example of a mobile user device display including navigation information according to some embodiments.

At S230, it may be automatically arranged for the map information to be displayed, along with information about the business process steps, via the user's mobile user device based at least in part on the current location of the mobile user device within the building and/or the current time. For example, FIG. 3 is an example of a mobile user device display 300 of an airport terminal that includes navigation information according to some embodiments. In particular, the user's current location is displayed (as an "X" in FIG. 3) along with a display area 310 that provides information about the next two business process steps he or she needs to perform (namely, visiting security lane one 320 at location "A" on the display 300 followed by a trip to an airline ticket counter at location "B" on the display 300). Of course, information about a single upcoming process step or more than two upcoming process steps might be provided to the user according to some embodiments. Note that real-time information about current wait times at security lane one 320 and other security lanes might be used by the system to select an efficient path for the traveler. Further note that the display might include alerts associated with the combination of time and location information associated with the process step (e.g., "next step: location xxx in yyy minutes"). Another display area 312 might indicate, for example, information about the user's flight.

According to some embodiments, the system may calculate a route associated with the current location of the mobile user device and a pre-determined location of at least one business process step. As illustrated in FIG. 3, a calculated route 330 will take the traveler through locations A, B, C, and D in the airport terminal. According to some embodiments, the user may interact with the display 300, such as by touching a selection area 340 to edit information, indicate when a particular step has been completed, and/or to request additional information from the system. For example, the user may manually indicate when a task is completed when such information cannot be automatically recognized by the system in real time. Further note that, according to some embodiments, process steps may be completed and acknowledged by the system automatically in substantially real time (based on information from a third party, the user's location, data transmitted to the user device, etc.) and the system may automatically direct the user to the next process step as appropriate.

Figure 4:
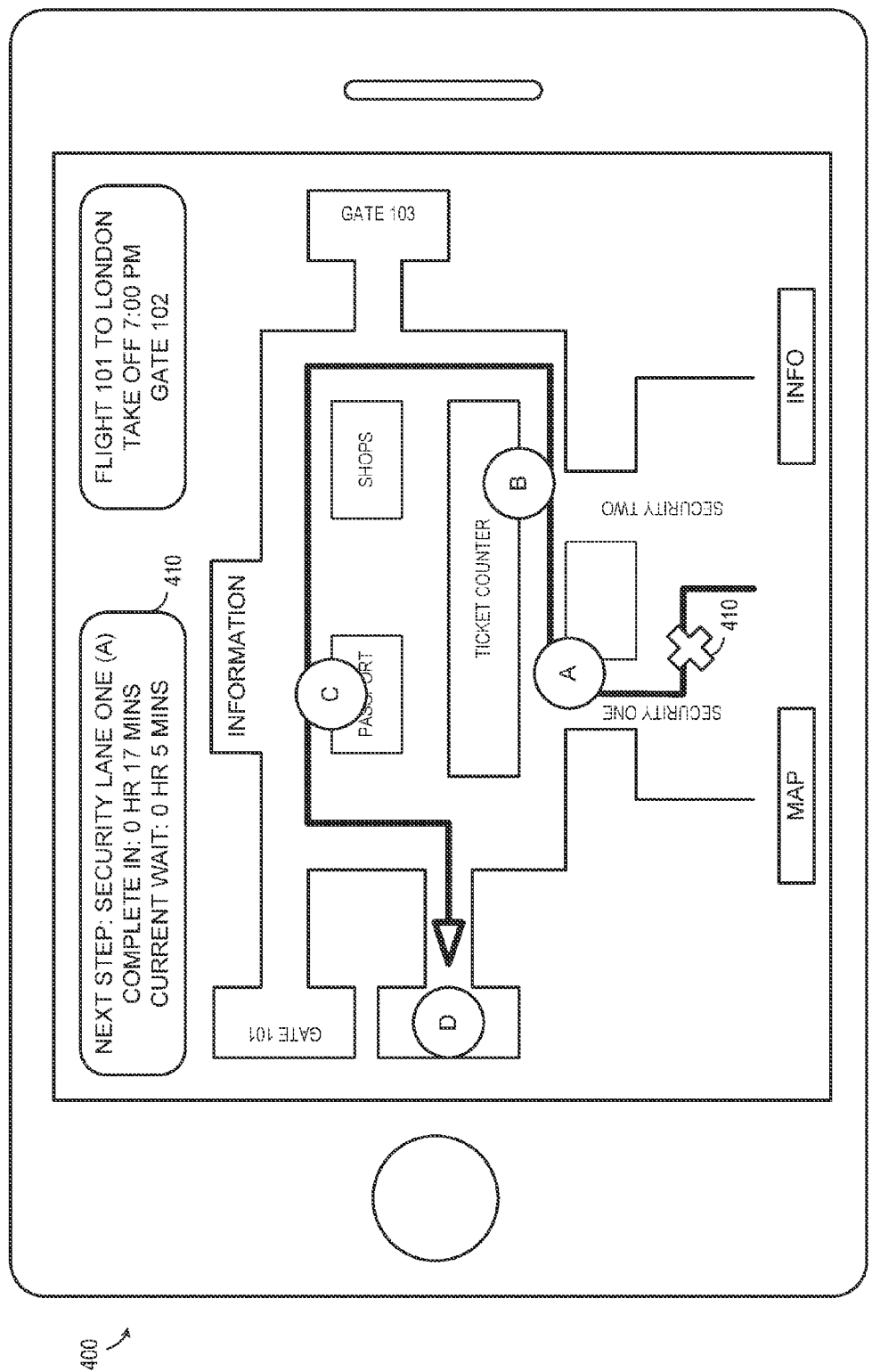
FIG. 4 is an example of a mobile user device display including a time value according to some embodiments.

According to some embodiments, the arranging performed at S230 includes calculating a "time value" associated with the current location of the mobile user device and a pre-determined location of at least one business process step. For example, FIG. 4 is an example of a mobile user device display 400 including a display area 410 that provides a time value according to some embodiments along with an indication 420 of the user's current location (as illustrated by an "X" in FIGS. 4 and 5). In particular, the area 410 might indicate when he or she needs to perform certain steps (e.g., to ensure that the traveler will reach the appropriate airport terminal gate before the flight departs) and/or an estimated amount of time it will take to perform those steps.

Figure 5:
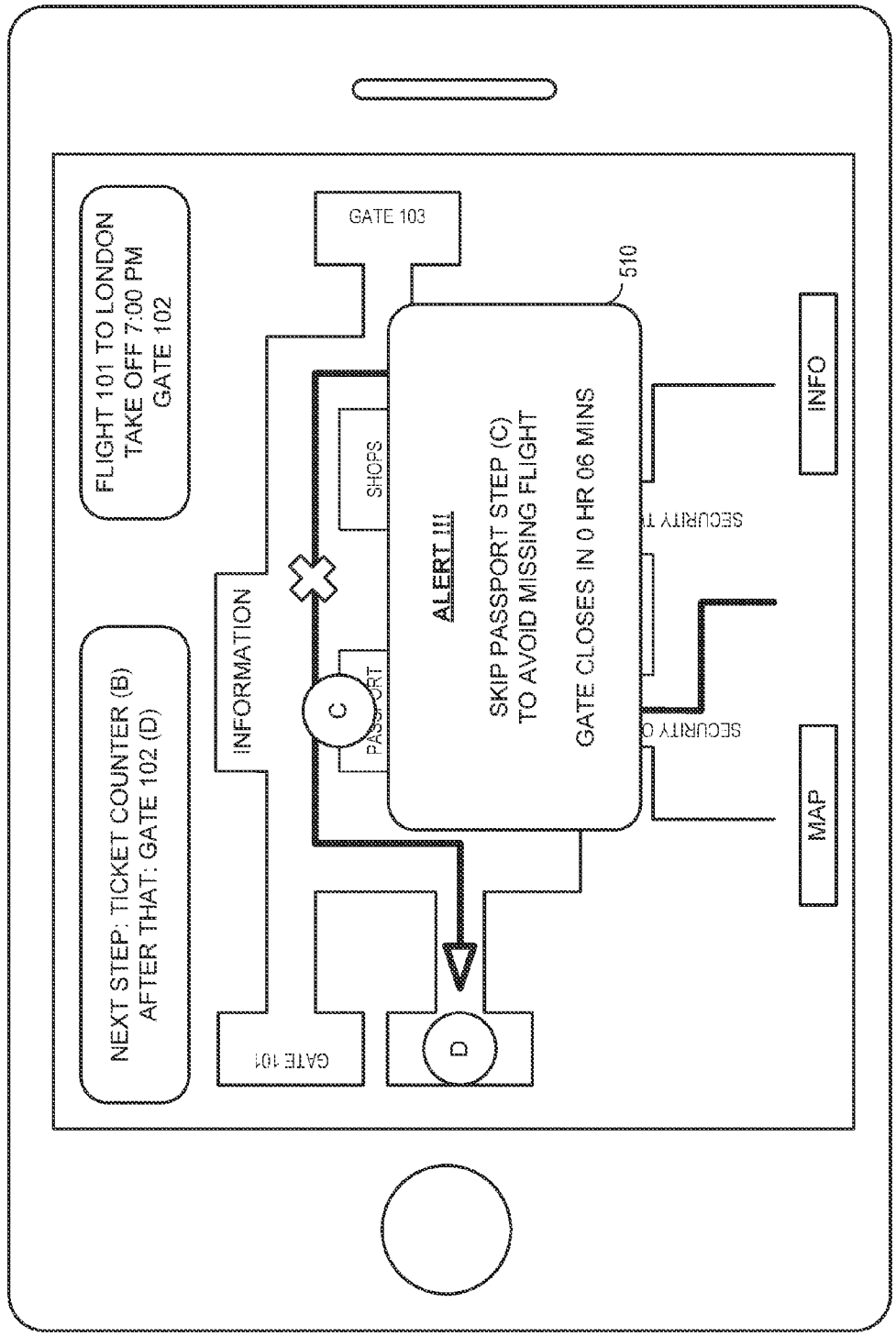
FIG. 5 is an example of a mobile user device display including a business process alert according to some embodiments.

Referring again to FIG. 2, if one or more alert conditions are not met at S240, the process continues at S210 (e.g., the system may continue by determining a new current location for the mobile user device). If one or more alert conditions are satisfied at S240, then an alert might be transmitted to the user, via the mobile user device, at S250 before the process continues. For example, FIG. 5 is an example of a mobile user device display 500 including a business process alert 510 according to some embodiments. The alert 510 might indicate, for example, that business process steps should be skipped and/or performed in a different order based on his or her current location, locations associated with various business process steps, the current time, a boarding or departure time, current airport conditions (including wait times), etc. Note that as used herein, a business process may represent a combination of a defined process that is closely related to a specific place or a specific place and time. In the case of a user who misses his or her flight, for example, the system may suggest alternatives, such as an optimal next available flight according to user traveler profile and/or status information.

Figure 6:
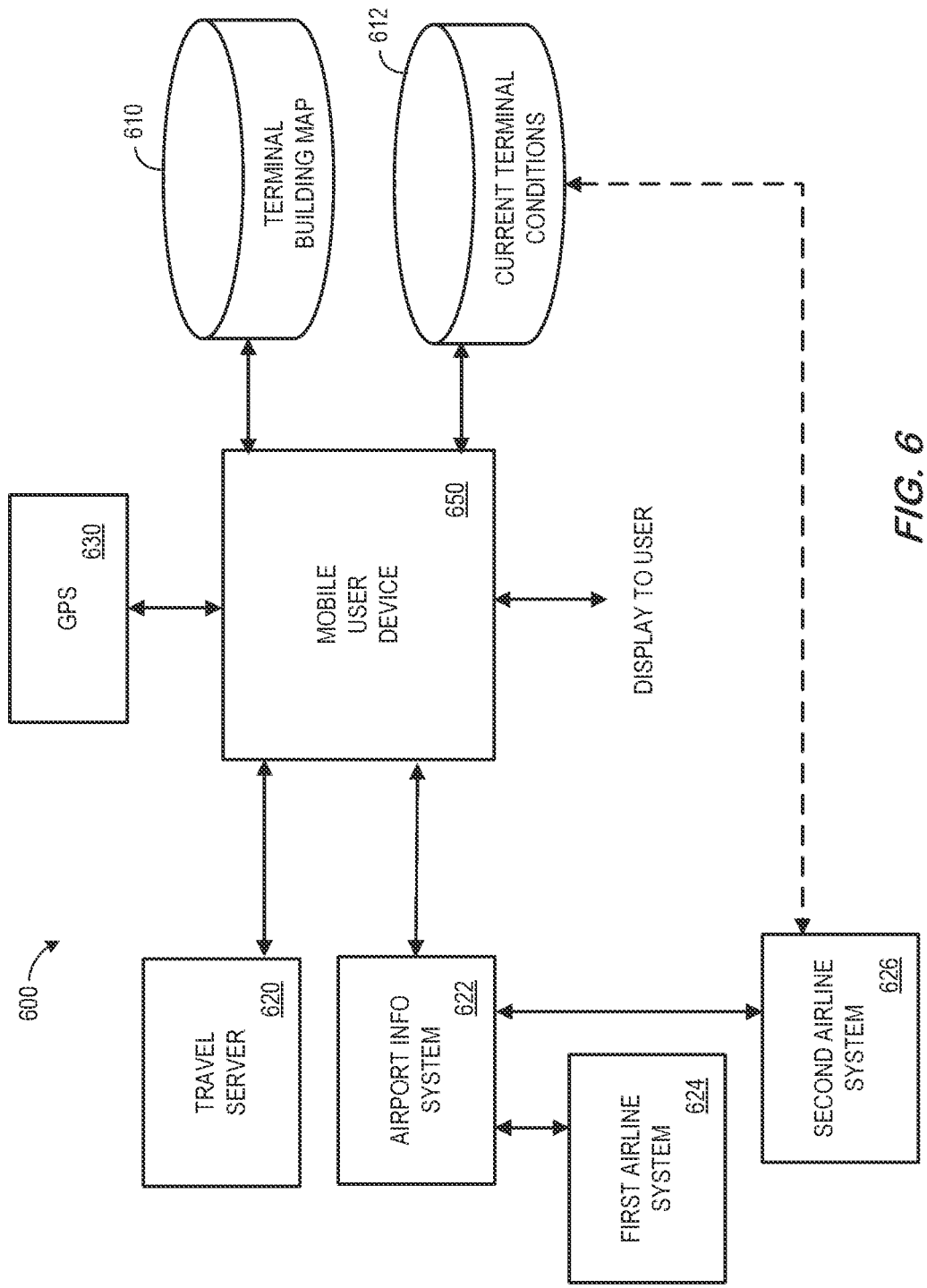
FIG. 6 is a block diagram of a system architecture according to some embodiments.

FIG. 6 is a block diagram of a system architecture 600 according to some embodiments. As before, the system 600 includes a mobile user device 650 that can exchange map information with a terminal building map 610. The mobile user device 650 might be associated with, by ways of example a mobile computer, a tablet, or a smartphone. The map information in the terminal building map 610 might, for example, include information about walls, pathways, rooms, floors, etc. associated with the airport terminal building. According to some embodiments, the mobile user device 650 also exchanges information about current terminal conditions 612 (e.g., flight delays or approximate wait times at various locations within the terminal building).

The mobile user device 650 may also exchange information about a series of business process steps with a travel server 620. The exchanged information might include, for example, a user name, a flight number and airline identifier, user profile information, etc. According to some embodiments, the mobile user device 650 also exchanges information with an airport information system 622 (e.g., which in turn may exchange information with a first airline system 624 and a second airline system 626).

According to some embodiments, the mobile user device 650 further exchanges information with a GPS system 630 and/or other location aware devices and/or services. For example, a combination of GPS and indoor mapping associated with Google maps or a "my location" social networking web site may be used to determine the current location of the mobile user device 650 and to generate a display to be provided to the user.

In this way, the system 600 may facilitate user navigation inside large and complex buildings, sites, or places which include step-by-step navigation instructions—including graphical, text, and/or voice instructions—associated with a sequential business process in substantially real-time. Moreover, a mobile application may offer the user an improved real-time experience based on the integrated data from several backend sources of information (including, according to some embodiments, Customer Relationship Management ("CRM") and/or Enterprise Resource Planning ("ERP") systems, travel agency backend systems or services, and/or airline or airport information systems or services). Such an approach may save a traveler time and avoid errors, conflicts, and/or confusion that might arise in the airport terminal or any other complex building or site. As a result, improved customer satisfaction and retention may be achieved while promoting the use of appropriate service locations and providers.

According to some embodiments, the system 600 may provide the user with options when a process step is missed or unavailable (e.g., due to a time limitations) according to his or her known user profile. Note that a user may not need to search for a specific place/stop on a map, and may instead be directed there according to the process combined with the user information known to the system. For example a route may be displayed to the user on the map. Moreover, messages may be displayed to alert him or her regarding how much time is left before the next required stop in the process. In the case of an airport terminal, for example, directions to a departure gate may be displayed and he or she may be directed to that location automatically after finishing the appropriate process steps (e.g., check-in, passport control, etc.).

A user mobile application may communicate with, control, and/or guide the user in substantially real-time throughout the process, and to provide him or her with a new experience while learning from user's decisions, actions, selections, habits, and/or personal preferences. That is, a user may avoid searching for the location of the next step in a process, but instead be guided there by the system automatically. For example, a user mobile application might notify, guide, and/or direct a user regarding what, where, and when information about the user's next step in the process via a map display and/or directions provided to the user. Other information that might be provided by the system includes, when the next flight departs, where the user is now, where the user should be next, when the user should be there, an amount of time left in view of the queues, where to check or pick up luggage, an airline counter number or range of numbers, suggestion of an optimal next flight available according to a traveler profile when a flight is accidently missed.

According to some embodiments, the system may provide information about and/or generated by a user back to the airport information system 622, such as where the user current is, any steps in the process experiencing an unusual delay (e.g., because a security checkpoint is overcrowded), etc. Such an approach may provide a smart learning system that can improve procedures according to real time data from users, provide valuable business information to better serve customers help an organization provide higher quality service.

Figure 7:
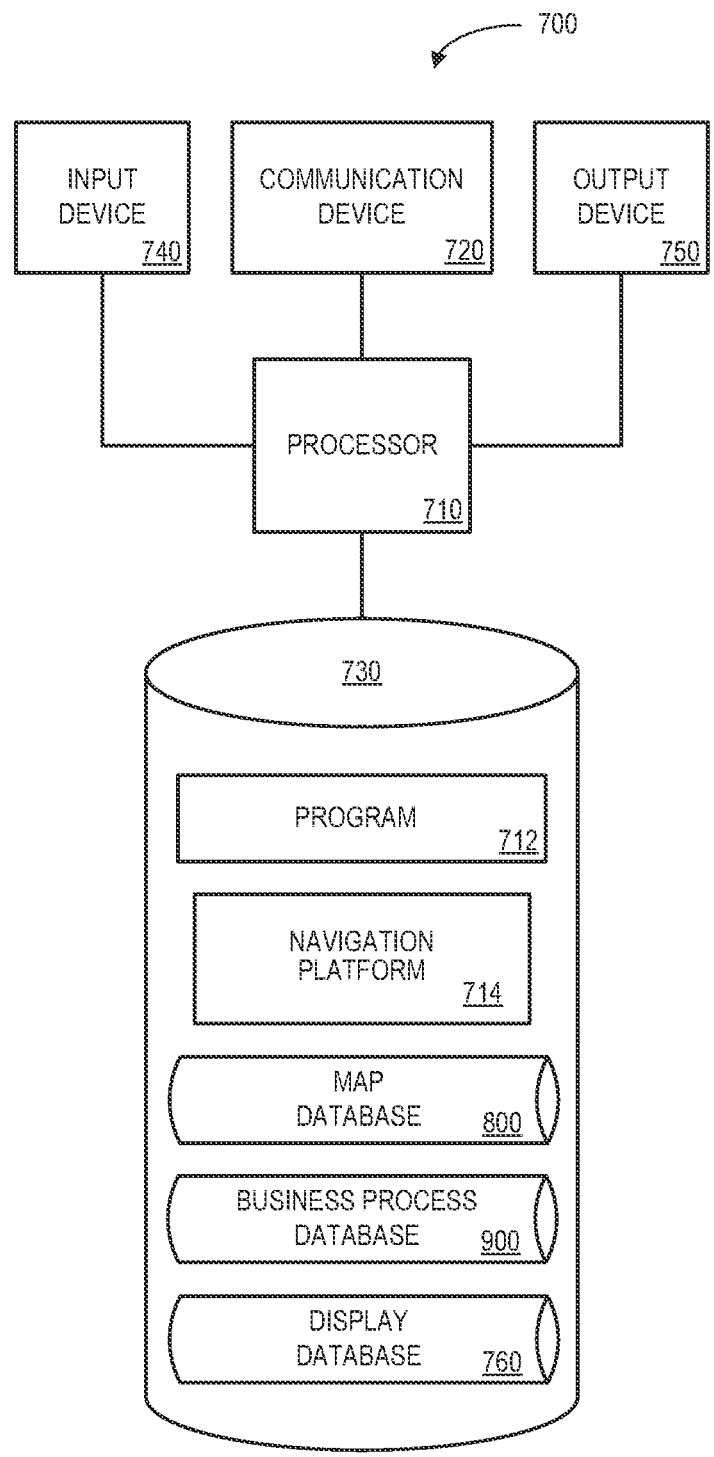
FIG. 7 is a block diagram of an apparatus according to some embodiments.

Accordingly, methods and mechanisms to efficiently, accurately, and/or automatically facilitate performance of a series of business process steps may be provided in accordance with some embodiments described herein. Note that the techniques described with respect to FIGS. 1 through 6 might be implemented using any of a number of different types of hardware. For example FIG. 7 is a block diagram overview of an apparatus 700 according to some embodiments. The apparatus 700 may be, for example, associated with a mobile user device, such as a smartphone or tablet computer. The apparatus 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used, for example, as an input path to receive information about building maps and/or business process steps. The apparatus 700 further includes an input device 740 (e.g., a touchscreen to enter information about a user's performance of various business process steps) and an output device 750 (e.g., a touchscreen display to provide navigation routes and alerts to a user such as location and time alert information).

The processor 710 communicates with a storage device 730. The storage device 730 may comprise any appropriate information storage device, including combinations of magnetic storage devices (e.g., a hard disk drive), optical storage devices, and/or semiconductor memory devices. The storage device 730 stores a program 712 and/or navigation platform 714 for controlling the processor 710. The processor 710 performs instructions of the programs 712, 714, and thereby operates in accordance with any of the embodiments described herein. For example, the processor 710 may determine a current location of the apparatus 700 within a building.

Map information, information including data about pre-determined locations within the building, may be retrieved by the processor 710 and business process information associated with a user's execution of a business process may be accessed. The business process may have, for example, a series of business process steps, and at least some of the business process steps may be associated with the pre-determined locations within the building. The processor 710 may then arrange for the map information to be displayed, along with information about the business process steps, based at least in part on the current location of the apparatus 700 within the building.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the apparatus 700 from another device; or (ii) a software application or module within the apparatus 700 from another software application, module, or any other source.

In some embodiments (such as shown in FIG. 7), the storage device 730 stores a map database 800, a business process database 900, and a display database 760 (e.g., including information about calculated routes, time values, etc.). An example of some databases that may be used in connection with the apparatus 700 will now be described in detail with respect to FIGS. 8 and 9. Note that the databases described herein are only examples, and additional and/or different information may be stored therein. Moreover, various databases might be split or combined in accordance with any of the embodiments described herein.

Referring to FIG. 8, a table is shown that represents the map database 800 that may be stored at the apparatus 700 according to some embodiments. The table may include, for example, entries identifying information about a building and locations within the building. The table may also define fields 802, 804, 806, 808, 810 for each of the entries. The fields 802, 804, 806, 808, 810 may, according to some embodiments, specify: a map identifier 802, a location identifier 804, a description 806, location values 808, and current conditions 810. The information in the map database 800 may be created and updated, for example, based on data received from a remote mapping service.

The map identifier 802 may be, for example, a unique alphanumeric code identifying a building and the location identifiers 804 may represent areas within the building. The description 806 describes the location and the location values 808 may define where the location is. For example, the location values 808 might represent latitude and longitude values, relative locations as compared to a current location or other location identifiers 804. The current conditions 810 may provide real-time information about the location, such as wait times, a deadline time for a location process step, an indication that the location is temporarily unavailable, etc. By providing "real-time" and appropriate time stamps (e.g., a goal of when a user should arrive at a specific location) during the process, the user may more efficiently and successfully navigate the tasks he or she needs to perform.

Figure 9:
FIG. 9 illustrates a portion of a business process database that might be stored in accordance with some embodiments.

Referring to FIG. 9, a table is shown that represents the business process database 900 that may be stored at the apparatus 700 according to some embodiments. The table may include, for example, entries identifying information about a series of business process steps that may be performed by a user. The table may also define fields 902, 904, 906, 908, 910 for each of the entries. The fields 902, 904, 906, 908, 910 may, according to some embodiments, specify: a business process identifier 902, a business process step identifier 904, a business process step description 906, one or more related locations 908, and a current status 910. The information in the business process database 900 may be created and updated, for example, based on data received from a remote business process server.

The business process identifier 902 may be, for example, a unique alphanumeric code identifying a process that may be executed by a user and the business process step identifiers 904 may represent a series of actions or interactions that comprise the business process. The business process step description 906 may describe the step and the related locations 908 may indicate where the step should be performed. For example, the action associated with business process step identifier S_101 is a security check that should be performed at locations L_101 or L1_102 (representing "security aisle one" and "security aisle two" as illustrated in the map database 800 of FIG. 8). The current status 910 might indicate whether or not the user has completed the associated action or that the action has not yet been performed ("pending").

Thus, some embodiments may establish methods and mechanisms to efficiently, accurately, and/or automatically facilitate performance of a series of business process steps. The system may automatically direct the user step-by-step through a process using map and/or audio information indicating what the next step is, where the next step is located, and/or time requirements associated with the next step. In this way, the user may avoid needing to search for the next process step (and instead, the information may be provided to the user automatically based on backend system data, user information, and/or the user's location). The systems described herein may save time and avoid user errors, conflicts, and confusion. Moreover, such approaches may provide for improved customer satisfaction (e.g., because he or she was able to easily and successfully complete a process) and retention while promoting the use of related service providers.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems and databases, note that embodiments may be associated with other types of enterprise data. For example, financial, governmental, educational, and/or medical processes may be supported in accordance with any of the embodiments described herein.

Moreover, while embodiments have been illustrated using particular types of tables and databases, embodiments may be implemented in any other of a number of different ways. For example, some embodiments might be associated with publically available information, such as flight or train schedules available via web sites.

Moreover, any of the embodiments described herein may incorporate business intelligence and/or smart learning systems to help optimize procedures according to real time data from users. Such types of valuable business information may better serve customers and/or help an organization improve service quality. Similarly, embodiments may provide analysis and prediction abilities and/or let a user information the system of unusual situations. For example, a user might inform the system that he or she has unusual luggage, and as a result be map-directed to an appropriate check-in post for that type of luggage.

Further note that any of the embodiments described herein may optionally be associated with advertising and/or marketing systems. For example, a mobile user device may offer deal suggestions to users from service providers located at an airport or otherwise connected to airline systems, such as: rental car providers; shuttle services; insurance services; tour services; and suggestions to users based on their location in the airport and deals in nearby duty free stores.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
    determining a current location of a mobile user device within a building, the mobile user device being associated with a user;
    retrieving map information, the map information including data about a plurality of pre-determined locations within the building and where at least some of the business process steps are associated with time limitations;
    accessing business process information associated with the user's execution of a business process having a series of business process steps, wherein the series of business process steps are associated with the plurality of pre-determined locations within the building;
    automatically arranging for the map information to be displayed, along with information about the business process steps, via the mobile user device based at least in part on the current location of the mobile user device within the building;
    receiving a first indication that a first business process step of the series of business process steps has been completed;
    in response to receiving the first indication that a first business process step of the series of business process steps has been completed, automatically directing a user to a location within the building that is associated with a second business process step of the series of business process steps; and
    alerting the user that a third business process step associated with a time limitation should be skipped or performed in a different order based on the user's current location, locations associated with the series of business process steps, and a current time in relation to the time limitation.

2. The method of claim 1, wherein the mobile user device is associated with at least one of: (i) a mobile computer, (ii) a smartphone, (iii) a tablet, (iv) a gaming device, (v) a navigation device, (vi) a music player, or (vii) glasses.

3. The method of claim 1, wherein the building is associated with at least one of: (i) an airport terminal, (ii) a train station, (iii) a hospital, (iv) a governmental building, (v) a convention or conference site, or (vi) an underground transportation system.

4. The method of claim 1, wherein the map information includes at least one of: (i) image information, (ii) video information, (iii) latitude and longitude information, (iv) building structure information, (vi) building pathways information, (vi) entrance information, (vii) exit information, (viii) real-time information, or (ix) multi-floor information.

5. The method of claim 1, wherein the business process is associated with at least one of: (i) a travel process, (ii) a governmental process, or (iii) a medical procedure.

6. The method of claim 1, wherein said determining is associated with at least one of: (i) global positioning satellite information, (ii) wireless telephone information, or (iii) Wi-Fi information.

7. The method of claim 1, wherein said accessing includes receiving information from at least one of: (i) a remote business server, (ii) a travel service, or (iii) a building information system.

8. The method of claim 1, wherein said arranging includes calculating a time value associated with the current location of the mobile user device and a pre-determined location of at least one business process step.

9. The method of claim 1, wherein said arranging includes calculating a route associated with the current location of the mobile user device and a pre-determined location of at least one business process step.

10. The method of claim 1, wherein said arranging includes transmitting an alert based on at least one of: (i) the current location of the mobile user device and a pre-determined location of at least one business process step, (ii) a current time and a pre-determined time of at least one business process step, or (iii) a combination of the current location and the current time in connection with at least one business process step.

11. A non-transitory, computer-readable medium storing program code executable by a computer processor to perform a medium, the medium comprising:
    determining a current location of a mobile user device within a building, the mobile user device being associated with a user;
    retrieving map information, the map information including data about pre-determined locations within the building and where at least some of the business process steps are associated with time limitations;
    accessing business process information associated with the user's execution of a business process having a series of business process steps, wherein the series of business of the business process steps are associated with the plurality of pre-determined locations within the building;
    automatically arranging for the map information to be displayed, along with information about the business process steps, via the mobile user device based at least in part on the current location of the mobile user device within the building;
    receiving a first indication that a first business process step of the series of business process steps has been completed; and
    in response to receiving the first indication that a first business process step of the series of business process steps has been completed, automatically directing a user to a location within the building that is associated with a second business process step of the series of business process steps; and
    alerting the user that a third business process step associated with a time limitation should be skipped or performed in a different order based on the user's current location, locations associated with the series of business process steps, and a current time in relation to the time limitation.

12. The medium of claim 11, wherein the mobile user device is associated with at least one of: (i) a mobile computer, (ii) a smartphone, (iii) a tablet, (iv) a gaming device, (v) a navigation device, (vi) a music player, or (vii) glasses.

13. The medium of claim 11, wherein the building is associated with at least one of: (i) an airport terminal, (ii) a train station, (iii) a hospital, (iv) a governmental building, (v) a convention or conference site, or (vi) an underground transportation system.

14. The medium of claim 11, wherein the map information includes at least one of: (i) image information, (ii) video information, (iii) latitude and longitude information, (iv) building structure information, (vi) building pathways information, (vi) entrance information, (vii) exit information, (viii) real-time information, or (ix) multi-floor information.

15. The medium of claim 11, wherein said arranging includes calculating a time value associated with the current location of the mobile user device and a pre-determined location of at least one business process step.

16. The medium of claim 11, wherein said arranging includes calculating a route associated with the current location of the mobile user device and a pre-determined location of at least one business process step.

17. The medium of claim 11, wherein said arranging includes transmitting an alert based on at least one of: (i) the current location of the mobile user device and a pre-determined location of at least one business process step, (ii) a current time and a pre-determined time of at least one business process step, or (iii) a combination of the current location and the current time in connection with at least one business process step.

18. A mobile user device associated with a user, comprising:
a communication port to: (i) facilitate a determination of a current location within a building, (ii) retrieve map information, including data about a plurality of pre-determined locations within the building, and (iii) access business process information associated with the user's execution of a business process having a series of business process steps wherein at least some of the business process steps are associated with time limitations, and wherein the series of the business process steps are associated with the plurality of pre-determined locations within the building; and
a processor coupled to the communication port and configured to (i) display map information, along with information about the business process steps, to the user based at least in part on the current location of the mobile user device within the building, (ii) receive a first indication that a first business process step of the series of business process steps has been completed, (iii) automatically direct a user to a location within the building that is associated with a second business process step of the series of business process steps in response to receiving the first indication that a first business process step of the series of business process steps has been completed and (iv) alert the user that a third business process step associated with a time limitation should be skipped or performed in a different order based on the user's current location, locations associated with the series of business process steps, and a current time in relation to the time limitation.

19. The mobile user device of claim 18, further comprising:
a storage device storing at least one of: (i) a map database, or (ii) a business process database.

20. The mobile user device of claim 18, wherein said communication port is adapted to exchange information with at least one of: (i) a global positioning satellite system, (ii) a wireless telephone system, (iii) a remote business server, (iv) a travel service, or (vi) a building information system.

21. The mobile user device of claim 18, wherein at least some of the business process steps are associated with time limitations.

* * * * *